June 27, 1933.　　　P. S. BAILEY　　　1,915,967
LIGHT PROJECTOR
Filed Jan. 15, 1931
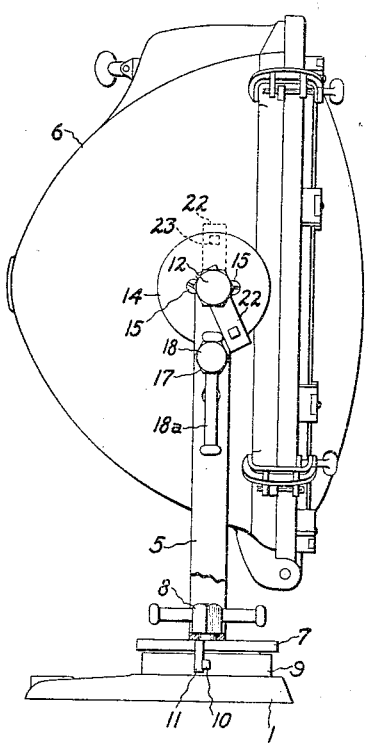
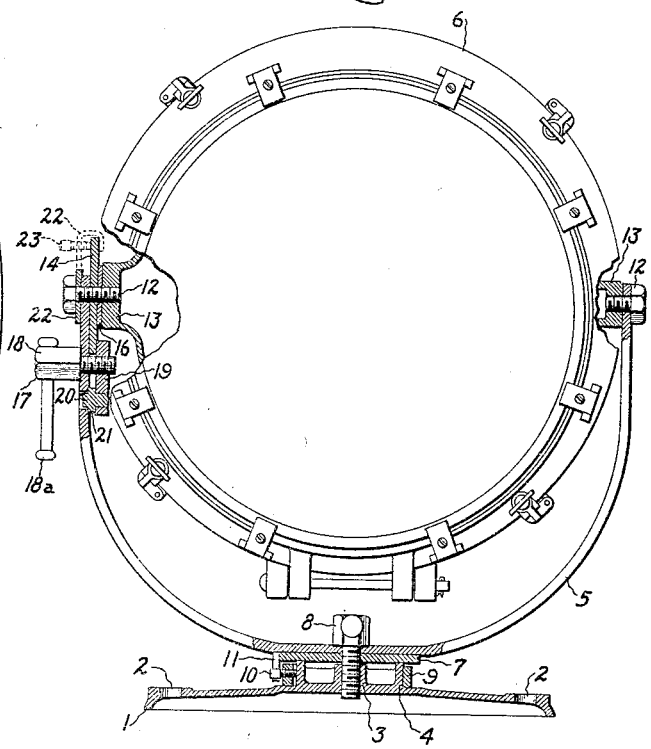
Inventor:
Percy S. Bailey
by Charles E. Mullen
His Attorney.

Patented June 27, 1933

1,915,967

UNITED STATES PATENT OFFICE

PERCY S. BAILEY, OF SWAMPSCOTT, MASSACHUSETTS, ASSIGNOR TO GENERAL ELECTRIC COMPANY, A CORPORATION OF NEW YORK

LIGHT PROJECTOR

Application filed January 15, 1931. Serial No. 508,990.

This invention relates to a light projector having a support rotatably mounted for adjustment on a base about a vertical axis and a projector rotatably mounted on the support for adjustment about a horizontal axis. More specifically the invention relates to a means for relocating the projector in its position of adjustment relative to its support after the projector has been moved out of its position of adjustment and also to a means for relocating the support in its position of adjustment relative to the base after the support has been moved out of its position of adjustment.

When light projectors are used for floodlighting purposes, as for the illumination of railroad yards, athletic fields, buildings or for other similar purposes, the projectors are usually adjusted angularly on their supports in order to throw the beam of light in a desired direction. However, it frequently becomes necessary to clean the interior of the projector, or to replace the lamp or to make repairs on the projector, and to perform this work, it is necessary to tilt the projector on its support to a position where the workman may have easy and convenient access to the interior of the projector. This tilting of the projector on its support necessarily destroys the original angular setting of the projector and after the workman has performed the necessary operations on the projector and it is again ready for use, it is necessary to re-set the projector to its previous position of angular adjustment relative to the support in order that the beam may be thrown in its original direction. This resetting of the projector requires an entire repetition of the original process of angularly setting the projector unless means are provided whereby the projector will automatically be re-set to its former position.

The object of the invention accordingly is to provide an improved means which functions to relocate a projector at its original angular position relative to its support, after the projector has been turned out of such position, and also a means for relocating the support in its original angular position relative to the base after the support has been turned out of such position.

For a consideration of what I believe to be novel and my invention, attention is directed to the following specification and the claims appended thereto.

In the drawing, Fig. 1 is a side view partly in section showing my improved re-setting means applied to a projector, and Fig. 2 is a front view partly in section of the projector shown in Fig. 1.

Referring to the drawing, the base 1 is shown as provided with perforations 2 through which may be passed suitable means for securing the base to a support. At its central portion the base is provided with an upstanding hub 3 and with an annular upstanding flange 4, the edge of the flange extending upwardly slightly beyond the edge of the hub. A U-shaped bracket 5 carrying the projector 6 has a base plate 7 permanently secured to it, by suitable means, as by welding, and this base plate rests on the flange 4. A screw 8 passes through the bracket and the base plate and is threaded into the hub 3, the screw acting to clamp the bracket 5 to the base 1. Surrounding the hub and rotatable thereabout is a ring or collar 9 which is provided with a set screw 10, the point of the screw being adapted to engage the outer periphery of the flange 4, while the head of the screw is adapted to abut against a depending lug 11 carried by the base plate 7 which projects into the path of rotation of the screw about the flange 4. By loosening the screw 8, the bracket carrying the projector may be rotated on the flange 4 about the axis of the screw until the projector is at the desired angular position relative to the base 1. The set screw 10 is then loosened and the collar 9 is rotated about the flange 4 until the head of the set screw strikes against the lug 11 whereupon the set screw is again tightened. The collar is thus held against movement about the flange, the head of the set screw thus forming a means for indicating the angular position of the projector relative to the base 1. The screw 8 is then tightened and the bracket carrying the projector is secured in the proper angular position relative to the base. Should it become necessary to rotate the projector to a different angular position on the base where a workman may more conveniently work on the projector, as for the purpose of cleaning it or repairing it, it is merely necessary to loosen the screw 8 and rotate the projector to any desired position about the axis of the screw. After the repair work has been accomplished, the projector is rotated until the lug 11 strikes the head of the set screw 10 whereupon the screw 8 is again tightened and the projector will have assumed its original angular position relative to the base 1.

The projector 6 is carried on the bracket 5 by means of trunnions 12, in the form of screws, which are threaded into the trunnion bosses 13 on the projector. A circular adjusting plate 14 is secured to one of the trunnion bosses by suitable fastening means, such as the screws 15, the plate being perforated centrally for the passage of the trunnion 12. Interposed between the plate and the face of the trunnion boss is a spacing washer 16, the screws 15 and the trunnion 12 passing through the washer, so that the washer and the adjusting plate will rotate with the projector about the trunnion. With the projector rotated to the proper angular position on the trunnions 12, it is held in such position by means of a clamp 17, which comprises a bolt 18, and a nut 19 carried on the shank of the bolt, the edge of the adjusting plate 14 being adapted to be clamped between an arm of the bracket 5 and the nut 19. A handle 18ª is provided for turning the bolt 18. A cylindrical member 20, provided intermediate its ends with an annular flange 21 of the same thickness as the adjusting plate, has one end seated in an opening in the bracket arm and the other end seated in an aligned opening in the nut 19 with the annular flange interposed between the nut and the bracket arm. The cylindrical member thereby acts to prevent rotational movement of the nut 19 when the bolt 18 is turned but permits longitudinal movement of the nut along the shank of the bolt to clamp the adjusting plate against the arm of the bracket. A hook member 22 loosely mounted on the trunnion 12 between the trunnion and the outer face of the bracket arm has its free end bent in the form of a U which fits over the periphery of the adjusting plate, the hook member being rotatable relative to the adjusting plate. A set screw 23 is threaded through one arm of the U-shaped end of the hook member and is adapted to be screwed into engagement with the face of the adjusting plate so that the hook member will rotate with the projector when the latter is rotated about the trunnions 12. In the drawing the hook member is shown in dotted lines as shifted to another position of adjustment on the plate 14.

When it is desired to adjust the projector about the trunnions 12, the clamp 17 is loosened and the projector is tilted until it has reached the desired angular position, whereupon the clamp is again tightened. The set screw 23 is then loosened and the hook member 22 is then swung around until it contacts the bracket 5. The set screw 23 is again tightened thus clamping the hook member to the adjusting plate. If it should now become necessary to tilt the projector to some other angular position where it will be more convenient for a workman to repair it, it is merely necessary to loosen the clamp 17 and turn the projector to any desired position. After the workman has completed his repairs, the projector is swung back until the hook member 22 contacts the bracket arm 5 and the clamp 17 is again tightened, the projector thus assuming its original angular position relative to the supporting bracket 5.

From the foregoing it will be apparent that the hook member 22 provides a quick and efficient means for re-setting the projector to its original angular position about a horizontal axis, while the collar 9 provides a similar means for re-setting the projector to its original angular position about a vertical axis.

In accordance with the provisions of the patent statutes I have described what I now consider to represent the best embodiment of my invention but it will be apparent that the invention may be carried out by other means.

What I claim as new and desire to secure by Letters Patent of the United States is:

1. The combination with a base, a support rotatably mounted on said base for adjustment about a vertical axis and a projector rotatably mounted on said support for adjustment about a horizontal axis, of means carried by said projector and adapted to engage said support for relocating the position of adjustment of said projector relative to said support after the projector has been moved out of its position of adjustment and means for relocating the position of adjustment of said support relative to said base after the support has been moved out of its position of adjustment, said last named means comprising a vertically projecting annular flange on said base, a collar surrounding said flange and rotatably adjustable relative thereto, a set screw passing through said collar and adapted to engage said flange to maintain said collar in adjusted position relative to said flange and a depending lug carried by said support and adapted to engage the head of said set screw.

2. The combination with a base, a support rotatably mounted on said base for adjustment about a vertical axis and a projector rotatably mounted on said support for adjustment about a horizontal axis, of adjustable means carried by said base and adapted to be engaged by said support for relocating the position of adjustment of said support relative to said base, after the support has been moved out of its position of adjustment, and adjustable means carried by said projector and adapted to engage said support for relocating the position of adjustment of said projector relative to said support after the projector has been moved out of its position of adjustment, said last named means comprising a plate secured to said projector and rotatable therewith about said horizontal axis, a hook member rotatably mounted on said support adjacent said plate and movable relatively thereto about said horizontal axis and means for locking said hook member to said plate whereby said hook member is caused to rotate with said projector, said hook being adapted to abut said support when the projector is rotated.

3. In a light projector, a base, a U-shaped support rotatably mounted at its center on said base for adjustment about a vertical axis, means for relocating the position of adjustment of said support relative to said base after the support has been moved out of its position of adjustment on said base, horizontal trunnions carried by the arms of said support, a projector rotatably mounted on said trunnions for adjustment relative to said support, means for maintaining said projector in adjusted position on said support and means for relocating the position of adjustment of said projector relative to its support after the projector has been moved out of said position of adjustment, said last named means comprising a circular plate mounted on one of said trunnions and secured to said projector to rotate therewith, a hook member having one end loosely mounted on said trunnion and having its other end bent angularly to fit over the periphery of said plate whereby the hook member is movable relative to said plate and is adapted to be moved into engagement with the adjacent arm of the support when the projector has been set in adjusted position on said support and a set screw passing through said hook member and engaging said plate to prevent relative movement between said hook member and said plate whereby said hook member is adapted, after the projector has been moved out of its position of adjustment on said support, to abut the adjacent arm of the support when the projector is moved toward the support, to relocate the projector in its original position of adjustment relative to said support.

4. In a light projector, the combination of a support, a projector mounted on said support for adjustment about a horizontal axis, a clamp for locking the projector to the support in any adjusted position, and stop means independent of said clamp carried by and rotated with the projector and adjustable relative to the projector to any point about the axis, said stop means adapted to engage the support to relocate one position of adjustment of the projector relative to the support after the projector has been moved out of the position of adjustment.

5. In combination, a base, a support mounted on said base for adjustment relative thereto, a projector mounted on said support for adjustment relative thereto, a clamp for locking said projector to said support in any adjusted position, and stop means independent of said clamp, carried by said projector and said support for relocating one position of adjustment of said projector relative to said support after the projector has been moved out of the position of adjustment.

6. In combination, a base, a support mounted on said base for adjustment relative thereto, a clamp for locking said support to said base in any adjusted position, stop means independent of said clamp carried by said base and said support for relocating one position of adjustment of the support relative to said base after the support has been moved out of the position of adjustment and a projector mounted on said support for adjustment relative thereto.

7. In combination, a base, a support mounted on said base for adjustment relative thereto, a clamp for locking said support to said base, stop means carried by said base and adapted to be engaged by said support for relocating one position of adjustment of the support relative to said base after the support has been moved out of the position of adjustment, a projector mounted on said support for adjustment relative thereto, a clamp for locking said projector to said support, and stop means carried by said projector and adapted to engage said support for relocating one position of adjustment of said projector relative to said support after the projector has been moved out of the position of adjustment.

8. In combination, a base, a support mounted on said base for adjustment relative thereto, a clamp for locking said support to said base, stop means carried by said base and adapted to be engaged by said support for relocating one position of adjustment of said support relative to said base after the support has been moved out of the position of adjustment, means to adjust the stop means relative to the base, a projector mounted on said support for adjustment relative thereto, a clamp for locking said projector to said support, stop means carried by said projector and adapted to engage said support for relocating one position of adjustment of said projector relative to said support after the projector has been moved out of the position of adjustment, and means to adjust the stop means relative to the projector.

In witness whereof, I have hereunto set my hand this 13th day of January, 1931.

PERCY S. BAILEY.